United States Patent [19]
Castleberry et al.

[11] 3,949,320
[45] Apr. 6, 1976

[54] MINIATURE CRYSTALLINE LASER

[75] Inventors: Donald E. Castleberry, Cambridge; Hans P. Jenssen, Belmont; Arthur Linz, Winchester, all of Mass.

[73] Assignee: Massachusetts Institute of Technology, Cambridge, Mass.

[22] Filed: Nov. 29, 1974

[21] Appl. No.: 528,308

[52] U.S. Cl. .................... 331/94.5 F; 331/94.5 C
[51] Int. Cl.² ........................................... H01S 3/16
[58] Field of Search ..... 331/94.5; 350/96 C, 96 WG

[56] References Cited
UNITED STATES PATENTS
3,760,297  9/1973  Thompson .................... 350/96 WG

*Primary Examiner*—William L. Sikes
*Attorney, Agent, or Firm*—Arthur A. Smith, Jr.; Robert Shaw; Martin M. Santa

[57] ABSTRACT

An optically pumped crystalline laser that includes a small single crystal section of a polygonal cylinder; the dimensions of the crystal section and the index of refraction of the crystal and the medium surrounding the crystal are such that there is formed a dielectric resonator that is totally reflective for a small number of modes. The material of which the crystal section is composed is one that is capable of being made optically thick in thin sections. The resonator is optically pumped and the lasing radiation therein is coupled to an optical element that is placed in close proximity thereto by virtue of an evanescent field that arises from the lasing action in the resonator.

19 Claims, 4 Drawing Figures

MINIATURE CRYSTALLINE LASER

This invention was developed in part under a contract with the Advanced Research Projects Agency and in part under a contract with the National Science Foundation, both agencies of the United States Government.

The present invention relates to miniature lasers compatible with dielectric waveguide and fiber optics transmission elements.

There accompanies herewith a copy of a paper entitled "A Single Mode 2.06 $\mu$m Miniature Laser" by the present inventors; the paper was presented at a meeting on integrated optics, Jan. 21–24, 1974, and was published in a booklet entitled *Digest of Technical Papers — Topical Meeting on Integrated Optics — January 21–24, 1974, Optical Society of America 74CH0870 — QEC*. There also accompanies herewith a copy of a report by the Massachusetts Institute of Technology to the sponsoring agency on the work surrounding the present invention. Both writings may be used to augment this specification.

Miniature lasers have recently become of interest because of their possible use as sources for integrated optical networks. In order to obtain an efficient minilaser, it is necessary to have in such laser a high absorption coefficient in the laser crystal at the pump wavelength. A problem arises in furnishing an appropriate resonator for such a laser. An additional problem encountered is that of coupling laser energy from the resonator cavity of the device to a surface waveguide.

An object of the present invention is to provide a miniature laser that attains a high level of absorption of pump energy.

Another object is to provide a miniature laser with a resonator that is tailored specifically for such small size device.

Another object is to provide a miniature laser that couples efficiently to a surface waveguide.

These and still further objects are discussed hereinafter and are particularly delineated in the appended claims.

The foregoing objects are achieved in an optically pumped crystalline laser having a single crystal section of a polygonal cylinder that forms part of a dielectric resonator that is substantially totally internally reflecting for a small number of modes, and preferable one mode. The dimensions of the crystal sections and its index of refraction, taking into consideration the index of refraction of the medium around the crystal section, are such as to provide a resonator that effects the required degree of internal reflection. The material of which the crystal section is composed is one that is capable of being made optically thick in thin sections. Means is provided for optically pumping the resonator, and there is provided an optical waveguide element in close enough proximity to the crystal section to permit coupling to the radiation within the resonator by virtue of an evanescent field that arises from lasing action in the resonator.

The invention is hereinafter described with reference to the accompanying drawing in which.

Figure 1:
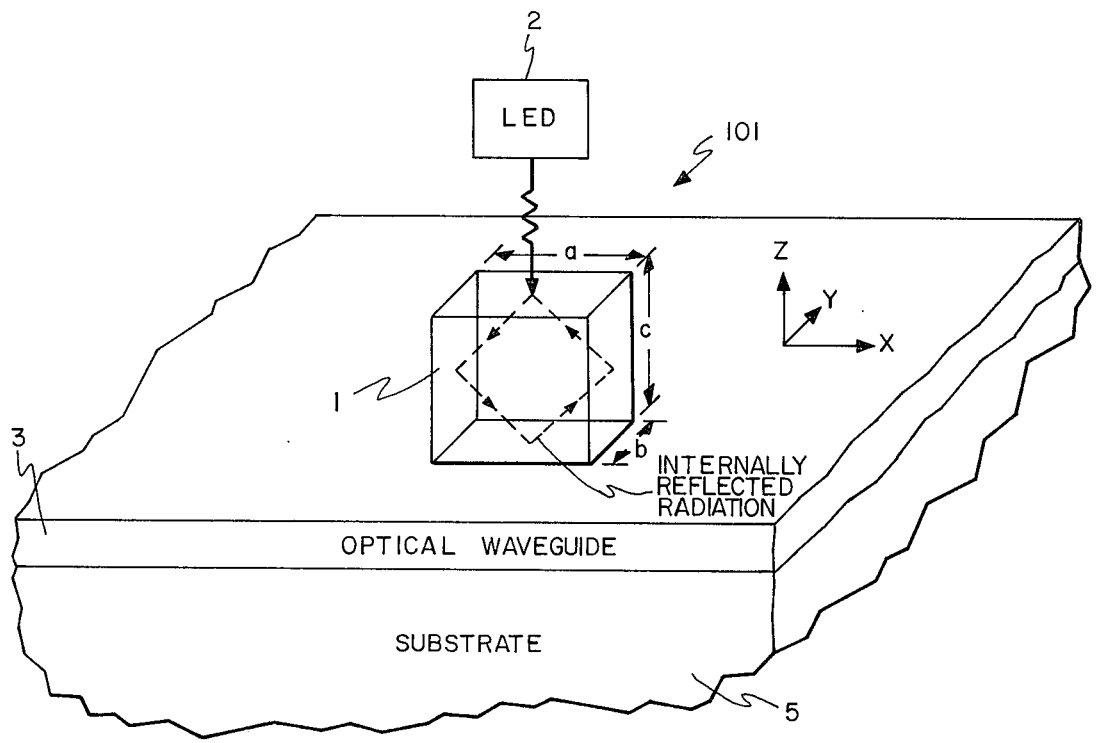
FIG. 1 is an isometric partial view, diagrammatic in form, showing a system embodying a form of the present invention.

Turning now to FIG. 1 there is shown at 101 an optically pumped crystalline laser system that includes a single crystal section 1 of a polygonal cylinder which, for illustrative purposes, is rectangular in cross section. The length, width and height dimensions, $a$, $b$ and $c$, respectively, and the index of refraction of the crystal section 1, together with the index of refraction of the medium surrounding the crystal section (here the surrounding medium is air), are chosen to give a dielectric resonator that is substantially totally internally reflective as to a single mode or a small number of modes. As is discussed in greater detail hereinafter, the material of which the crystal section 1 is composed is one that is capable of being made optically thick in thin sections.

Figure 2:
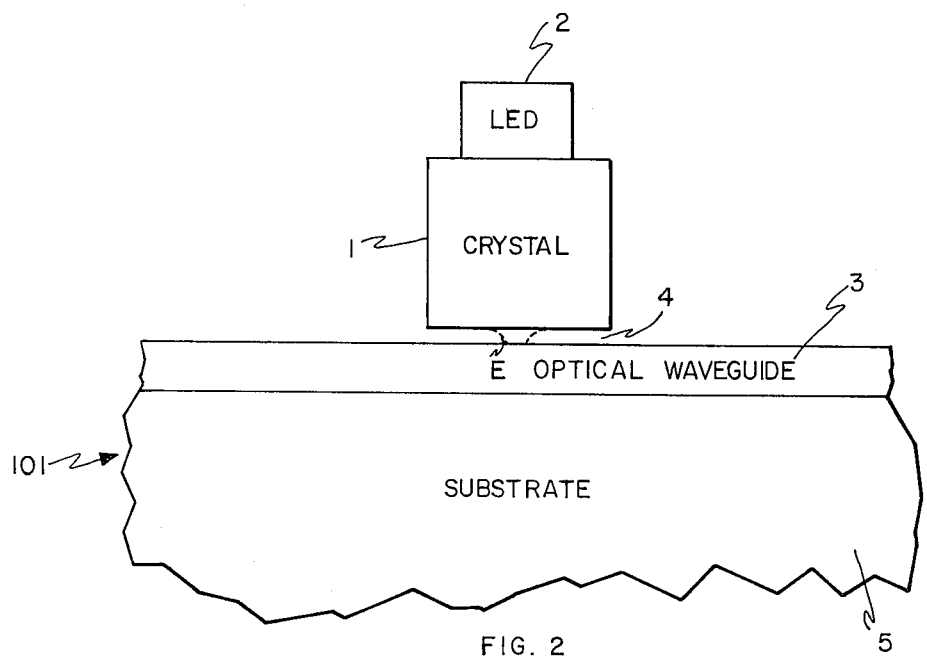
FIG. 2 is a side diagrammatic view showing the same elements as in FIG. 1.

The dielectric resonator, comprising the crystal 1 and the surrounding medium, is optically pumped by a light emitting diode 2. An optical waveguide element 3 is placed in close proximity to the crystal section 1 to permit coupling by virtue of an evanescent field that arises from the lasing action in the resonator. In FIG. 2 the evanescent field labeled E is represented by a broken line; the field E decays exponentially across the air gap shown at 4 in FIG. 2 between the crystal section 1 and the optical waveguide element 3. It will be appreciated that energy propagation in the system 101 is in the $\pm$ X direction in the optical waveguide 3 and that proper orientation of the elements making up the system is necessary to effect the desired transmission. The block marked 2 in FIG. 1 and representing an LED, as above noted, is shown slightly separated from the crystal, but in the remaining figures is shown attached to the crystal section 1 as it, in fact, is in an operating system. The optical waveguide 3 typically is a one micron thick film of glass or other optical film on a glass or a crystalline substrate 5. To place this disclosure in context at this juncture, some typical dimensions are: $a \sim 0.5$mm, $b \sim 0.1$mm, $c \sim 0.5$mm, and the gap is typically about five microns.

The material of which the crystal 1 consists includes a host crystal which will accept large concentrations of transition metal activator ions or rare earth activator ions. Such host crystal can be, for example, $La_{(1-x)}RE_xP_5O_{14}$, wherein $0 < x < 1$ and RE is a rare earth which can be, by way of illustration, Nd, or a combination of rare earths. Or the host crystal can be one that will accept large concentrations of transition metal sensitizer ions or rare earth sensitizer ions with efficient energy transfer to small concentrations of rare earth activator ions or to small concentrations of transition metal activator ions, e.g., Ho: $LiY_{1-x-y} Yb_x Tm_y F_4$ wherein $0 < x + y < 1$;

Nd: $Y Al_{1-x} Cr_x O_3$ wherein $0 < x < 1$;

and

Ho: $Ca Y_{2(1-x)} RE_{2x} Mg_{2(1-y)} M_{2y} Ge_3 O_{12}$ wherein, again, $0 < x < 1$, $0 < y < 1$ and M is a transitional metal such as Ni, for example, or a combination of transition metals.

Figure 3:
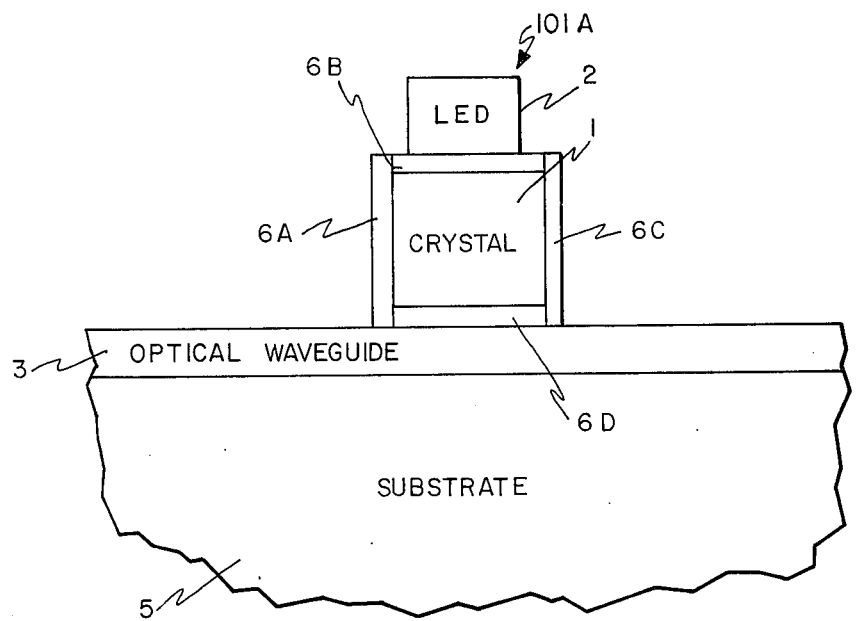
FIG. 3 is a side diagrammatic view of a modification of the system of FIG. 1.

The system in FIG. 1 is one in which the environment around the polygonal crystal element 1 is air. In the system shown at 101A in FIG. 3, the sides of the crystal element 1 have a thin layer (layers 6A, 6B, 6C, and 6D) covering the surfaces thereof to change the mode structure of the resonator. The index of refraction of the layers 6A, etc., differ from the index of refracton of the crystal, from the optical element 3, and may differ from one another. Typically, the layers 6A, etc., can be the order of one micron thick. Typical layer material can be glass or crystalline film.

Figure 4:
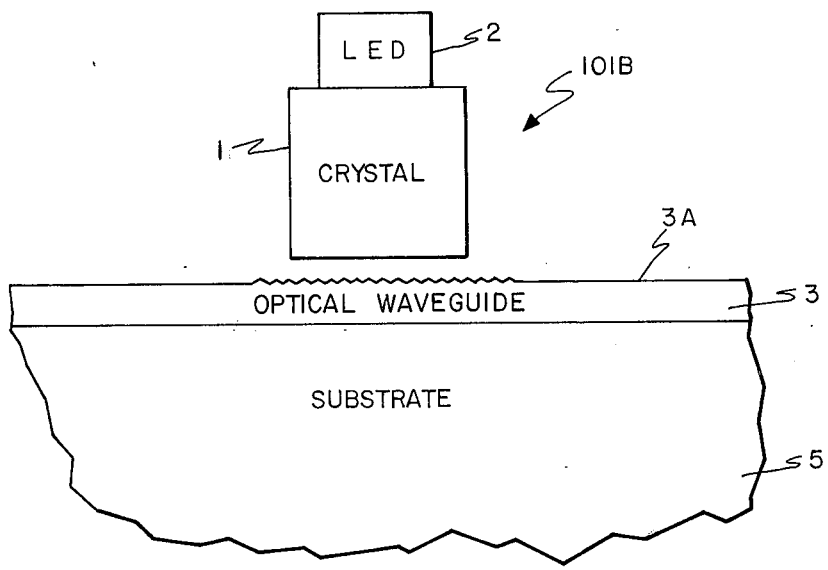
FIG. 4 is a side diagrammatic view of a further modification.

The system designated 101B in FIG. 4 has a grating 3A on the surface thereof adjacent the crystal 1. The purpose of the grating is to match the resonator mode to the waveguide mode.

Modifications of the invention herein disclosed will occur to persons skilled in the art and all such modifications are deemed to be within the spirit and scope of the invention as defined by the appended claims.

What is claimed is:

1. An optically pumped crystalline laser system that comprises: a polygonal cylindrical section of an insulating single crystal laser material, the dimensions of the cylindrical section and the index of refraction of the laser material and the medium surrounding the crystalline section being such that there is provided a dielectric resonator that is substantially totally internally reflective for a small number of modes, the laser material of which the crystal section is composed being one that is capable of being made optically thick for pump light in thin sections to effect lasing therein; an optical transmission element in close proximity to the crystal section to permit coupling by virtue of an evanescent field that arises from lasing action in the dielectric resonator; and means for optically pumping said laser material to effect lasing therein.

2. An optically pumped crystalline laser as claimed in claim 1 wherein the dimension of the dielectric resonator together with the characteristics of the coupling mechanism to the optical transmission element are chosen to provide single mode operation.

3. An optically pumped crystalline laser as claimed in claim 1 in which the optical transmission element is an optical waveguide.

4. A laser as claimed in claim 1 in which said laser material comprises a host crystal that contains transition metal activator ions and that will accept, without quenching, large concentrations of said transition metal activator ions.

5. A laser as claimed in claim 4 in which said laser material is a host crystal taken from the group consisting essentially of fluorides and other halides, and oxides and in which the host crystal contains large quantities of activator ions.

6. A laser as claimed in claim 1 in which said laser material comprises a host crystal which contain sensitizer ions and activator ions and which will accept large concentrations of said sensitizer ions with efficient energy transfer to small concentrations of said activator ions.

7. A laser as claimed in claim 6 in which said laser material is $LiY_{(1-x)}RE_xF_4$, wherein $0 < x < 1$ and RE comprises a rare earth.

8. A laser as claimed in claim 6 in which said laser material is $CaY_{2(1-x)}RE_{2x}Mg_{2(1-y)}M_{2y}Ge_3O_{12}$, wherein $0 < x < 1$, $0 < y < 1$, RE comprises a rare earth and M comprises a transition metal.

9. A laser as claimed in claim 1 having a thin layer of dielectric covering at least one surface of the polygonal cylindrical section to change the mode structure of the resonator, the index of refraction of the layer being different from the index of refraction of the laser material.

10. A laser as claimed in claim 9 in which there is a thin layer of dielectric material covering each surface of the polygonal cylindrical section.

11. A laser as claimed in claim 1 in which the means for optically pumping is a light-emitting diode.

12. A laser as claimed in claim 11 in which the light-emitting diode is bonded to the resonator to form an integrated unit comprising a miniature laser and pump.

13. A laser as claimed in claim 1 in which said laser material is a host crystal that contains rare earth activator ions and that will accept, without quenching, large concentrations of said rare earth activator ions.

14. A laser as claimed in claim 13 in which the host crystal is $La_{(1-x)}RE_xP_5O_{14}$, wherein $0 < x < 1$, and RE is a rare earth.

15. A laser as claimed in claim 14 in which RE is Nd.

16. A laser as claimed in claim 13 in which the host crystal is $La_{(1-x)}RE_xP_5O_{14}$, wherein $0 < x < 1$ and RE is a combination of rare earths.

17. An optically pumped miniature laser system that comprises: a section of single crystal laser material, the dimensions of the crystal section, the index of refraction of the laser material, and the index of refraction of the medium surrounding the section of laser material being such that there is provided a resonator that is substantially totally internally reflective for a small number of modes, the material of which the crystal section is composed being one that is capable of being made optically thick for pump light in thin sections to effect lasing therein; an optical transmission element in close proximity to the crystal section to permit coupling to the lasing radiation in the resonator; and means for optically pumping said laser material to effect lasing therein.

18. A miniature laser system as claimed in claim 17 in which the parameters of the resonator are chosen, in combination with characteristics of the coupling mechanism to the optical transmission element, to give single-mode operation.

19. A miniature laser system as claimed in claim 18 in which the optical element is an optical transmission waveguide.

* * * * *